Patented Sept. 6, 1949

2,480,961

UNITED STATES PATENT OFFICE 2,480,961

METHOD OF MAKING ALPHA, BETA-DI-METHYLENESUCCINONITRILE

Erhard J. Prill, Cresskill, N. J., assignor to United States Rubber Company, New York, N. Y., a corporation of New Jersey No Drawing. Application August 29, 1947, Serial No. 771,378

5 Claims. (Cl. 260—465.8)

1

This invention relates to a method of preparing $\alpha,\beta$-dimethylenesuccinonitrile, which is a compound useful both as a polymerizable unsaturated monomer and as an intermediate for the synthesis of other compounds. More particularly it relates to the preparation of $\alpha,\beta$-dimethylenesuccinonitrile from a 2,3-dicyano-3-buten-2-yl ester of a lower monocarboxylic acid. In another aspect it relates to an improved method of preparing $\alpha,\beta$-dimethylenesuccinonitrile from lower monocarboxylic acid diesters of 2,3-butanedione bis-cyanohydrin.

I have discovered that $\alpha,\beta$-dimethylenesuccinonitrile can be prepared by the thermal decomposition of an ester of 2,3-dicyano-3-buten-2-ol with a lower carboxylic acid containing from one to seven carbon atoms, as illustrated by the following equation;

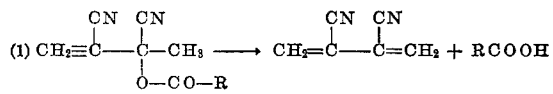

in which R is selected from the group consisting of hydrogen, phenyl, and alkyl groups having from one to six carbon atoms, examples of which are methyl, ethyl, n-propyl, isopropyl, n-butyl, isobutyl, secondary butyl, tertiary butyl, any of the amyl radicals including n-amyl, active amyl, isoamyl, secondary amyl, neopentyl, secondary isoamyl, tertiary amyl, any of the hexyl radicals including n-hexyl, isohexyl, etc.

In accordance with the present invention the 2,3-dicyano-3-buten-2-yl ester of the monocarboxylic acid is heated at an elevated temperature and for a time such as to effect thermal decomposition of the ester to form the desired $\alpha,\beta$-dimethylenesuccinonitrile which is recovered from the reaction effluent. The reaction is preferably carried out at a temperature of from 400°–500° C. and for a contact time of from 15 to 30 seconds. The vapors of the 2,3-dicyano-3-buten-2-yl ester, either by itself or in admixture with a suitable unreactive solvent which facilitates introduction of the ester, e. g. acetone, may be continuously passed through a reactor, such as a reaction tube, which is maintained at a temperature from 400°–500° C., at such a rate that contact times of from 15 to 30 seconds are attained. The reaction can be conducted at atmospheric pressure. Alternatively the reaction can be conducted at reduced pressures and/or in the presence of an inert diluent such as nitrogen or acetone vapor. The hot gaseous effluent may be treated in any suitable manner to recover the $\alpha,\beta$-dimethylenesuccinonitrile therefrom. This may conveniently be accomplished by condensing the hot effluent gas, removing any diluents present, and isolating and purifying the $\alpha,\beta$-dimethylenesuccinonitrile by fractional distillation of the residue.

As a result of my discovery $\alpha,\beta$-dimethylenesuccinonitrile can be prepared in an improved manner from lower monocarboxylic acid diesters of 2,3-butanedione bis-cyanohydrin by a two-stage process, the first stage of which comprises heating the lower monocarboxylic acid diester of 2,3-butanedione bis-cyanohydrin in a reaction zone at an elevated temperature and for a time such as to effect thermal decomposition of the diester to form the 2,3-dicyano-3-buten-2-yl ester of the monocarboxylic acid (as disclosed and claimed in my co-pending application, Serial No. 769,535, filed Aug. 19, 1947, now Patent No. 2,446,167, granted August 3, 1948). The monoester is recovered from the effluent and is thereafter thermally decomposed in a separate reaction zone in the second stage according to the present invention to form $\alpha,\beta$-dimethylenesuccinonitrile, which is recovered from the second stage reaction effluent in the manner described above. When employing such a two-stage process for the preparation of $\alpha,\beta$-dimethylenesuccinonitrile from the diester, I prefer to use in the first thermal decomposition step a temperature of from 400° to 500° C. and a contact time of from 0.2 to 5 seconds, and in the second thermal decomposition step a temperature of 400° to 500° C. and a contact time of from 15 to 30 seconds. The over-all yield of $\alpha,\beta$-dimethylenesuccinonitrile from the diester is considerably better by the use of my two-stage process than by a single stage process; under favorable circumstances being as much as a hundred per cent higher.

The following example discloses my invention in more detail. All parts are by weight.

Example

The reaction vessel, a 40-inch length of 30 mm. Pyrex tubing packed with 3–8 mesh quartz chips and equipped with a heater, is maintained at 435° C. while 50 parts of 2,3-dicyano-3-buten-2-yl acetate are passed through it with an average contact time of approximately 25.0 seconds (based on the volume of free space in the tube).

The hot effluent gases are condensed in a receiver cooled by dry ice and containing 0.1 part of hydroquinone as a polymerization inhibitor. Fractional distillation of the condensate yields $\alpha,\beta$-dimethylene-succinonitrile, which boils at approximately 80° C./8 mm. with considerable sublimation.

Having thus described my invention, what I claim and desire to protect by Letters Patent is:

1. A method of making α,β-dimethylenesuccinonitrile which comprises heating a 2,3-dicyano-3-buten-2-yl ester of a monocarboxylic acid, having the structural formula

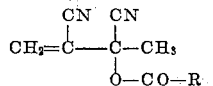

where R is selected from the group consisting of hydrogen, alkyl groups having from one to six carbon atoms and phenyl, for a time of from 15 to 30 seconds in a reaction zone maintained at a temperature of from 400° to 500° C., removing the products from the reaction zone, and recovering α,β-dimethylenesuccinonitrile therefrom.

2. A method of making α,β-dimethylenesuccinonitrile which comprises heating 2,3-dicyano-3-buten-2-yl acetate, having the structural formula

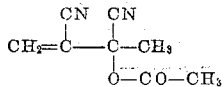

for a time of from 15 to 30 seconds in a reaction zone maintained at a temperature of from 400° to 500° C., removing the products from the reaction zone, and recovering α,β-dimethylenesuccinonitrile therefrom.

3. A method of making α,β-dimethylenesuccinonitrile which comprises heating 2,3-dicyano-3-buten-2-yl acetate, having the structural formula

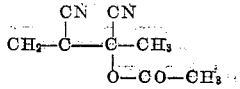

for an average contact time of approximately 25 seconds in a reaction zone maintained at a temperature of 435° C., removing the products from the reaction zone, and recovering α,β-dimetylenesuccinonitrile therefrom.

4. A method as recited in claim 1 wherein said heating step is conducted at atmospheric pressure.

5. A method of making α,β-dimethylenesuccinonitrile which comprises heating a lower monocarboxylic acid diester of 2,3-butadiene biscyanohydrin for a time of from 0.2 to 5 seconds in a reaction zone maintained at from 400 to 500° C., recovering from the reaction effluents a 2,3-dicyano-3-buten-2-yl ester of a monocarboxylic acid having the structural formula

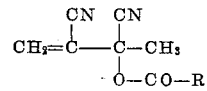

where R is selected from the group consisting of hydrogen, alkyl groups having from one to six carbon atoms and phenyl, heating said 2,3-dicyano-3-butene-2-yl ester for a time of from 15 to 30 seconds in a separate reaction zone maintained at a temperature of from 400 to 500° C., and recovering α,β-dimethylenesuccinonitrile from the resulting reaction effluent.

ERHARD J. PRILL.

REFERENCES CITED

The following references are of record in the file of this patent:

UNITED STATES PATENTS

| Number | Name | Date |
|---|---|---|
| 2,328,890 | Clifford et al. | Sept. 7, 1943 |
| 2,444,882 | Tawney | July 6, 1948 |

Certificate of Correction

Patent No. 2,480,961 September 6, 1949

ERHARD J. PRILL

It is hereby certified that errors appear in the printed specification of the above numbered patent requiring correction as follows:

Column 3, line 36, for that portion of the structural formula reading "$CH_2-C$" read $CH_2=C$; column 4, line 4, for "-dimetylene-" read -*dimethylene-*;
and that the said Letters Patent should be read with these corrections therein that the same may conform to the record of the case in the Patent Office.

Signed and sealed this 3rd day of January, A. D. 1950.

[SEAL]

THOMAS F. MURPHY,
*Assistant Commissioner of Patents.*